(12) United States Patent
Boers et al.

(10) Patent No.: US 8,761,161 B2
(45) Date of Patent: *Jun. 24, 2014

(54) TECHNIQUES FOR RELIABLE SWITCHOVER TO A DATE MULTICAST DISTRIBUTION TREE (MDT)

(75) Inventors: Arjen Boers, Sitges (NL); Ijsbrand Wijnands, Leuven (NL); Nidhi Bhaskar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 13/296,386

(22) Filed: Nov. 15, 2011

(65) Prior Publication Data

US 2012/0057594 A1    Mar. 8, 2012

Related U.S. Application Data

(63) Continuation of application No. 11/440,756, filed on May 25, 2006, now Pat. No. 8,068,481.

(51) Int. Cl.
*H04L 12/28* (2006.01)
*H04H 20/71* (2008.01)
*H04L 12/50* (2006.01)

(52) U.S. Cl.
USPC ............ 370/370; 370/256; 370/312; 370/390

(58) Field of Classification Search
None
See application file for complete search history.

(56) References Cited

U.S. PATENT DOCUMENTS

| | | | |
|---|---|---|---|
| 5,517,494 A | 5/1996 | Green | |
| 6,215,766 B1 | 4/2001 | Ammar et al. | |
| 6,400,688 B1 * | 6/2002 | Lau et al. | 370/236.1 |
| 6,505,253 B1 | 1/2003 | Chiu et al. | |
| 6,728,777 B1 | 4/2004 | Lee et al. | |
| 7,301,936 B2 | 11/2007 | Wan et al. | |
| 7,830,787 B1 * | 11/2010 | Wijnands et al. | 370/218 |
| 2002/0073086 A1 * | 6/2002 | Thompson et al. | 707/10 |
| 2007/0168555 A1 | 7/2007 | Dorenbosch | |
| 2008/0037576 A1 * | 2/2008 | Hwang et al. | 370/432 |

OTHER PUBLICATIONS

Rosen et al., Cisco Systems, Inc., Network Working Group, Internet Draft, "Multicast in MPLS/BGP IP VPNs", May 2004, 21 pages.*
Minei et al., Cisco Systems, Inc., Network Working Group, Internet-Draft, "Label Distribution Protocol Extensions for Point-to-Multipoint and Multi-point-to-Multipoint Label Switched Paths", Oct. 14, 2001, 19 pages.
Rosen and Aggarwal, Cisco Systems, Inc. and Juniper Networks, Network Working Group, Internet Draft, "Multicast in MPLS/BGP IP VPNs", May 2005, 56 pages.

* cited by examiner

*Primary Examiner* — Faruk Hamza
*Assistant Examiner* — Thinh Tran
(74) *Attorney, Agent, or Firm* — Fish & Richardson P.C.

(57) ABSTRACT

Techniques reliably provide the switchover from a default MDT to the data MDT by using reliable signaling and reliable building of a data MDT. The message notifying of the pending switchover to the data MDT is reliably sent using signaling that is reliable. Also, the switchover from the default MDT to the data MDT does not happen until all egress routers have responded to the message. Egress routers join the data MDT if associated receivers are interested in receiving the multicast stream from a source. The router does not send another response upstream until all egress routers downstream from it respond to the message in the positive or the negative.

20 Claims, 4 Drawing Sheets

TECHNIQUES FOR RELIABLE SWITCHOVER TO A DATE MULTICAST DISTRIBUTION TREE (MDT)

CROSS-REFERENCE TO RELATED APPLICATIONS

This application is a continuation application of and claims priority to U.S. application Ser. No. 11/440,756, filed on May 25, 2006, the contents of which are incorporated herein by reference.

BACKGROUND OF THE INVENTION

Embodiments of the present invention generally relate to networking and more specifically to techniques for reliably switching from a default multicast distribution tree (MDT) to a data MDT for a multicast stream.

A default MDT is a point-to-multipoint tunnel between provider edge (PE) routers. The default MDT may be used in virtual private network (VPN) to provide multicast traffic to receivers. All PE routers for the VPN join the default MDT. Each PE router may be associated with a receiver. When data for a multicast stream is sent, all receivers for the PE routers receive the multicast stream. A receiver receives the multicast stream even if the receiver is not interested in it.

A data MDT may be used to offload the multicast stream to specific receivers that are interested in receiving the multicast stream. This alleviates receivers from being flooded with data they do not wish to receive. When a switchover to a data MDT is desired, a head-end router sends messages to other PE routers on the default MDT indicating that a switchover to a data MDT will be performed for a specific multicast stream. The signaling from the head-end router is unreliable. Thus, some PE routers may not receive the message. However, making the message reliable is not considered necessary because the head-end router may send another message soon after, such as a minute after.

Receivers that are interested in the multicast stream have their associated PE routers send a response indicating that they would like to join the data MDT. A data MDT is then built based on these requests. Thus, the building of the data MDT is receiver-driven. The head-end router does not know when all receivers that are interested in the multicast stream have actually joined the data MDT (or if receivers have even received the notification of the pending switchover). Also, the head-end router may not even know if a data MDT has been set up. Rather, the switchover is performed without any of this knowledge. Accordingly, this may result in lost packets as receivers that are interested in the multicast stream will not receive the multicast stream.

DETAILED DESCRIPTION OF EMBODIMENTS OF THE INVENTION

Figure 1:
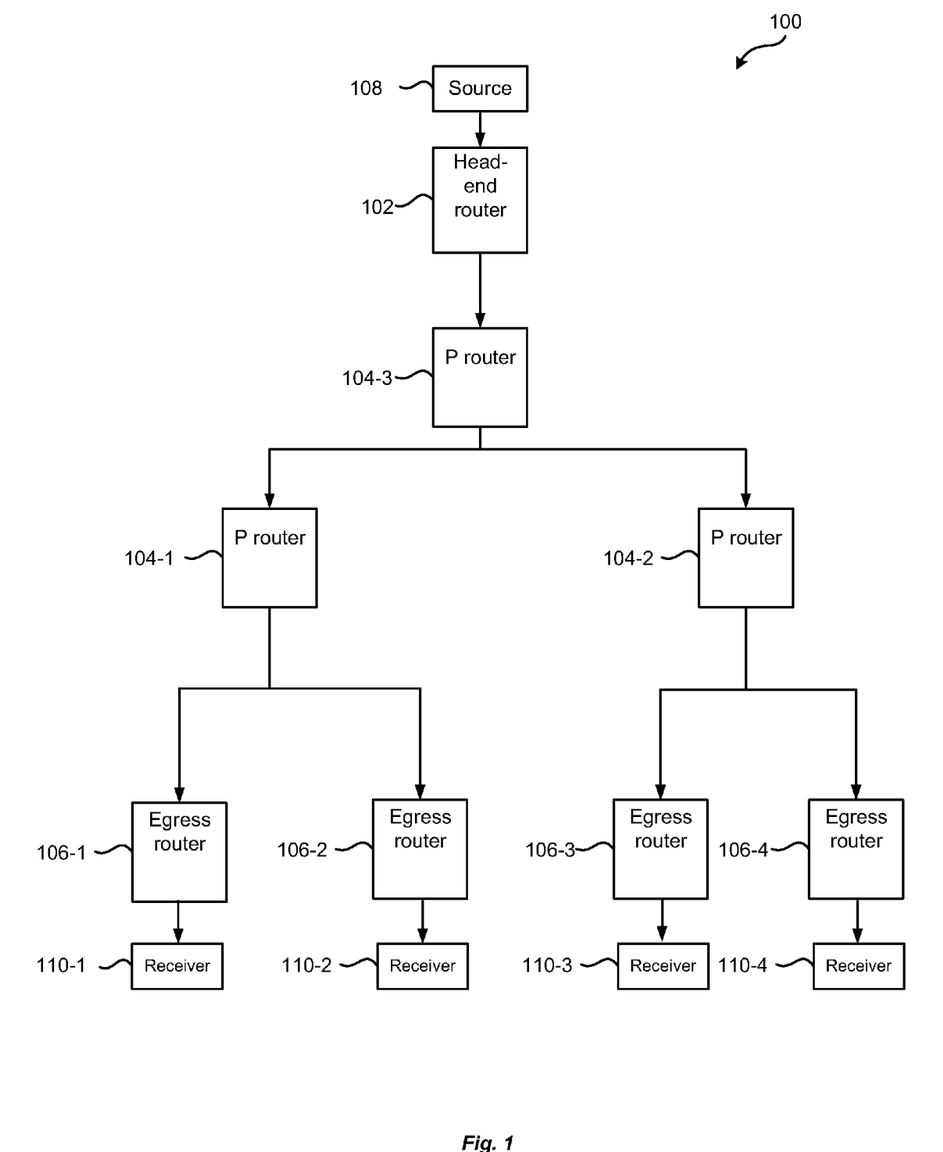
FIG. 1 depicts a system for providing reliable switchover for a default MDT to a data MDT for a multicast stream according to one embodiment.

FIG. 1 depicts a system 100 for providing reliable switchover for a default MDT to a data MDT for a multicast stream according to one embodiment. As shown, a network is provided that includes a head-end router 102, P routers 104, and egress routers 106. Also, a source 108 and receivers 110 are provided. It will be recognized that other network configurations of the network shown will be appreciated.

Source 108 is configured to provide information that receivers 110 may be interested in receiving. For example, source 108 is a multicast source that outputs a multicast stream of information. The multicast stream may be packets of information, or any other form of data.

Receivers 110 may be any devices that can receive the stream of traffic from source 108. Each receiver 110 is associated with an egress router 106.

Head-end router 102, P routers 104, and egress routers 106 may be any network devices. Although a router is described, it will be understood that other network devices may be appreciated, such as switches, gateways, etc.

Head-end router 102 is configured to receive the multicast stream from source 108. Head-end router 102 is then configured to send the stream to egress routers 106.

P routers 104 may be routers found in the core of the network. Any number of P routers 104 may be appreciated. P routers 104 are considered to be downstream from head-end router 102 and route the multicast stream to egress routers 106.

Egress routers 106 are configured to receive the multicast stream and to send it to receivers 110. Egress routers 106 may be at the edge of a network.

In one embodiment, the network may be a virtual private network (VPN). In a multicast VPN (MVPN) domain model, a default MDT is built for the VPN. It is VPN specific. The default MDT is a tree that includes all egress routers 106 in it. It is used to send a multicast stream to all egress routers 106 in the network.

The default MDT is set up using signaling between head-end router 102 and egress routers 106. In one embodiment, protocol independent multicast (PIM) may be used to set up the default MDT. For example, PIM joins are sent upstream from egress routers 106 to build the default MDT.

When the default MDT is used to send a multicast stream, all receivers 110 in the default MDT receive the stream even if receivers 110 have no interest in the multicast stream. Thus, a data MDT is used to allow only select receivers 110 to receive a multicast stream from source 108. Receivers 110 can join the data MDT only if they are interested in receiving the multicast stream. Thus, when a multicast stream is sent using the data MDT, only receivers 110 that join the data MDT receive the multicast stream. This prevents receivers 110 from being flooded with data they do not wish to receive.

To send a multicast stream using a data MDT, a switchover from the default MDT to the data MDT occurs. The data MDT has to be built before the switchover. If the switchover is performed before all interested receivers 110 join the data MDT, then those receivers 110 will not receive the multicast stream after the switchover occurs. Accordingly, embodiments of the present invention provide a reliable switchover from a default MDT to a data MDT.

Embodiments of the present invention reliably provide the switchover to the data MDT by using reliable signaling and reliable building of the data MDT. The message notifying of the pending switchover to the data MDT is reliably sent using signaling that is reliable. Also, the switchover from the default MDT to the data MDT does not happen until all egress routers 106 have responded to the message. Egress routers 106 join the data MDT if associated receivers 110 are interested in receiving the multicast stream from source 108.

When it is determined that a switchover from a default MDT to a data MDT is desired, head-end router 102 sends a mapping request message indicating that a switchover is going to happen for a specific multicast stream. As described above, in one embodiment, this message is sent using reliable signaling. For example, reliable signaling may be a transfer control protocol (TCP) connection between head-end router 102 and each of egress routers 106. TCP is a protocol that guarantees reliable delivery of data. Over the connection, messages can flow in two ways. Other protocols that are reliable may be used in place of TCP. For example, border gateway protocol (BGP) may be used. In other embodiments, protocols that are not considered reliable may be used. However, other checks may be implemented to ensure that messages are received.

Accordingly, head-end router 102 sends a mapping request message to egress routers 106 advertising which data MDT should be joined to receive a specific multicast stream. Egress routers 106 then signal back through the connection if they are interested and will be joining this data MDT.

The joining of the data MDT is done reliably in that the switchover does not happen until responses have been received from all egress routers 106. In one embodiment, when egress router 106 receives a mapping message through the connection, if egress router 106 is interested in receiving the multicast stream, it needs to join the data MDT sent in the mapping request message. The mapping request message includes information needed to join the data MDT. For example, in one embodiment, the mapping request message may include an identification of source 108, a group and VPN identifier to uniquely identify the multicast stream, and a forward equivalence class (FEC) of the data MDT that should be referenced. A forward equivalence class is used to group IP packets that should be sent with the same forwarding treatment.

Egress router 106 may determine if an associated receiver 110 is interested by using the group and VPN identifier. For example, egress router 106 may include a list of multicast streams that receiver 110 is interested in. This list is checked and it is determined if receiver 110 is interested in the multicast stream.

If egress router 106 has a receiver 110 that is interested in the multicast stream, a mapping response message is sent to a directly-connected router upstream in the direction of head-end router 102. For example, if egress router 106-1 is sending a mapping response message, the mapping response message is sent to P router 104-1.

The mapping response message includes an indication that egress router 106 is interested in receiving the multicast stream. In one embodiment, the mapping response message includes the FEC for the default MDT that has already been joined, the FEC for the data MDT (learned from the mapping request message), and a specific indication as to whether egress router 106 wants to receive the traffic from the multicast stream or not (i.e., join the data MDT). For example, the specific indication may be a positive multicast label distribution protocol (MLDP) label binding message that includes the two FECs. If egress router 106 does not want to receive the traffic from the multicast stream, the mapping response message may include the two FECs with a negative label binding message. MLDP is a standard multicast protocol used to negotiate the labels (addresses) used to forward packets. Although MLDP is described, it will be understood that other protocols may be used, such as protocol independent multicast (PIM) with reliability extensions.

An upstream router receives the mapping response messages. The upstream router only forwards another upstream mapping message upstream when responses are received from all routers downstream that it should receive responses for according to the default MDT. For example, P router 104-1 is coupled through an interface to egress routers 106-1 and 106-2. P router 104-1 can determine from the default MDT, such as from a replication list for the default MDT, which routers are coupled to it through the interface. Thus, P router 104-1 knows that responses should be received from egress routers 106-1 and 106-2. The reason why the default MDT replication list can be used is that joining the default MDT is mandatory for all egress routers 106 in the network. Thus, it can be relied on to determine which downstream routers should send responses.

P router 104-1 thus waits until mapping response messages are received from both egress routers 106-1 and 106-2. Because egress routers 106 are configured to send a mapping response message whether they are interested or not, P router 104-1 knows it will eventually receive mapping response messages from egress routers 106-1 and 106-2. Also, since a reliable signaling protocol is used to send the mapping request message, P router 104-1 knows that egress routers 106-1 and 106-2 received the mapping request message.

Thus, a positive or negative mapping response message is received at P router 104-1 from egress routers 106-1 and 106-2. P router 104-1 then forwards a mapping response message upstream that includes the responses from egress routers 106-1 and 106-2. In one embodiment, a P router 104 only sends a positive or negative message upstream. It does not include which egress routers 106 sent the positive or negative mapping. For example, if egress routers 106-1 and 106-2 both respond with a negative mapping response, P router 104-1 forwards a negative response upstream to P router 104-3. Likewise if egress routers 106-3 and 106-4 respond with a positive mapping, P router 104-2 sends a positive response upstream to 104-3. Now, P router 104-3 only needs to send a positive response to head-end router 102. The negative responses do not have a label binding, so P router 104-3 does not send traffic to P router 104-1 but sends traffic to P router 104-2 as the positive mapping provides a label binding that is used forward packets on. P router 104-3 knew that egress routers 104-1 and 104-2 were downstream receivers for the default MDT. If a positive and negative response is received at P router 104, then a positive response may be sent up stream. For example, if egress router 106-1 sends a positive mapping response and egress router 106-2 sends a negative mapping response, P router 104-1 may send a positive mapping response upstream. However, when P router 104-1 receives the traffic for the multicast stream, it can send the traffic to egress router 106-1 and not egress router 106-2. This is because P router 104-1 may keep track of which responses it receives.

For P router 104-2, the process is the same as it expects to receive mapping response messages from egress routers 106-3 and 106-4. When those mapping response messages are received, P router 104-2 sends another mapping response message upstream.

P routers 104-1 and 104-2 then send their mapping response messages to P router 104-3. P router 104-3 is configured to wait until a response is received from P routers 104-1 and 104-2. In this case, P router 104-3 knows that it should receive a mapping from P routers 104-1 and 104-2. When the mapping response messages are received from P routers 104-1 and 104-2, P router 104-3 sends another mapping response message to head-end router 102.

As the mapping response messages are sent upstream, the data MDT may be built. When head-end router 102 receives the mapping response message, it can determine that the data MDT has been completely set up before switching the multicast stream for source 108 from the default MDT to the new data MDT. This is because mapping response messages are not sent upstream until all routers have responded.

While waiting for the data MDT to be set up, packets will flow via the default MDT. Thus, there is no packet loss when switching. Eventually, head-end router 102 receives the mapping response message for the data MDT. When head-end router 102 receives the mapping response messages, it knows that all egress routers 106 have joined the data MDT if desired.

When the final mapping response message is received from P router 104-3, head-end router 102 knows all routers 106 have responded. The data MDT may be receiver-driven in that the data MDT is built as responses are being sent upstream. The FEC for the data MDT is then used to join routers 106 to the data MDT if they are interested in joining. Thus, the data MDT is built when the final message is received at head-end router 102.

In another embodiment, the data MDT may also be built by head-end router 102 and thus is head-end driven. For example, resource reservation protocol-traffic extension (RSVP-TE) may be used to set up the data MDT. For example, if head-end router 102 receives signaling that egress routers 106-1 and 106-3 desire the traffic, head-end router 102 may set up the data MDT to egress routers 106-1 and 106-3 using reliable signaling.

Figure 2:
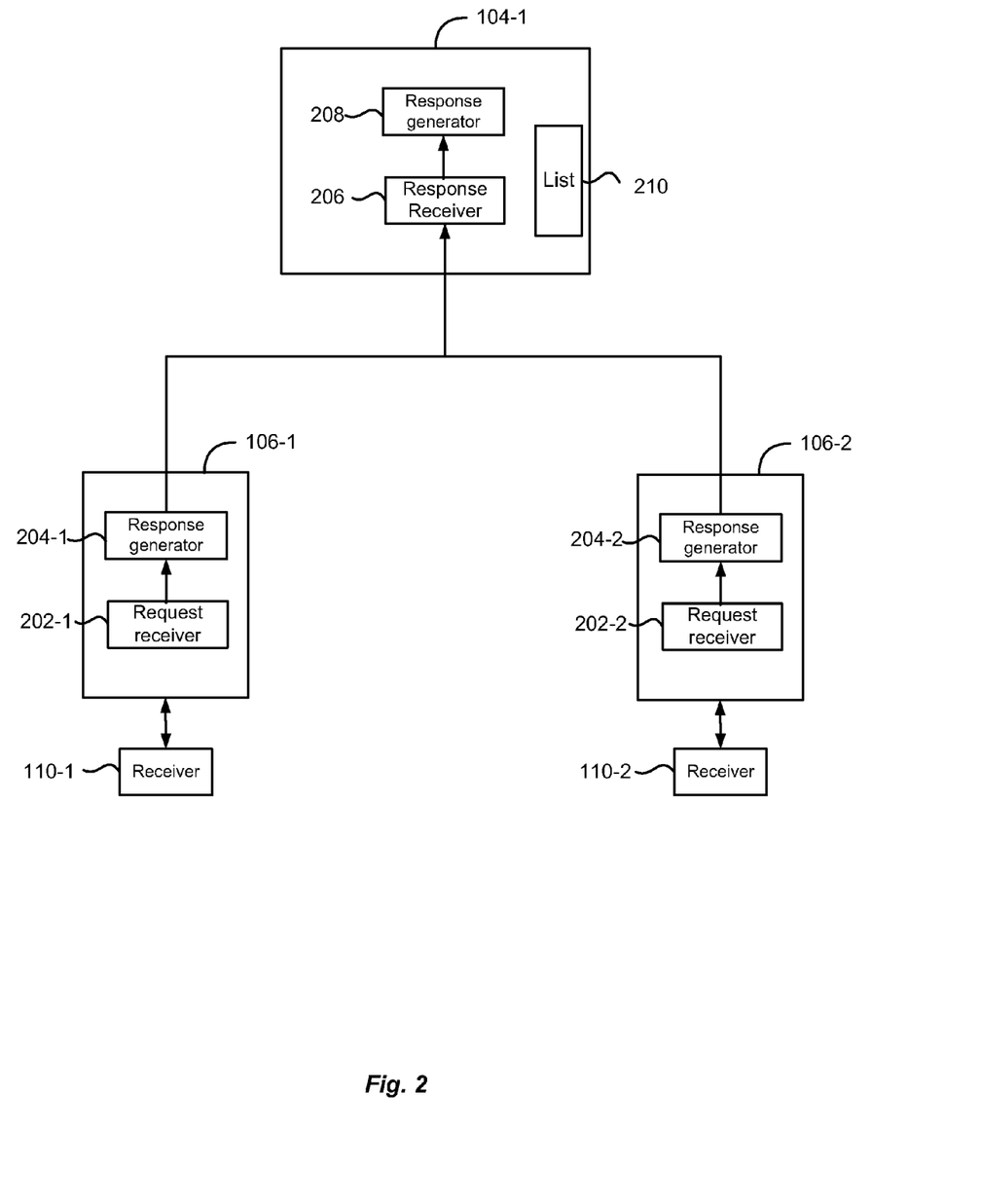
FIG. 2 depicts a more detailed embodiment of a P router and egress routers according to one embodiment of the present invention.

FIG. 2 depicts a more detailed embodiment of a P router 104 and egress routers 106 according to one embodiment of the present invention. As shown, a sub-section of the network is provided that includes P router 104-1 and egress routers 106-1 and 106-2.

A request receiver 202-1 in egress router 106-1 is configured to receive the mapping request message for joining a data MDT for a specific multicast stream. Request receiver 202-1 then determines if receiver 110-1 is interested in receiving the multicast stream for the data MDT.

Response generator 204-1 is then configured to generate a mapping response message that indicates whether or not receiver 110 is interested in the multicast stream. For example, a mapping response message may indicate in the positive or negative whether receiver 110-1 wants to receive the multicast stream. Response generator 204 then sends a response to P router 104-1.

Egress router 106-2 also includes a request receiver 202-2 and response generator 204-2. Request receiver 202-2 and response generator 204-2 perform the same functions as described with respect to egress router 106-1. However, they determine if receiver 110-2 is interested in receiving the multicast stream. A response in the positive or negative is sent to P router 104-1.

Response receiver 206 of P router 104-1 is configured to receive the mapping response messages from response generators 204-1 and 204-2. Response receiver 206 is configured to wait until responses are received from all routers connected through an interface. For example, response receiver 206 uses a default MDT list 210 to determine routers that are coupled to it through an interface. Default MDT list 210 includes all the routers 106 that have joined the default MDT. The FEC class for the default MDT in the response may be used to determine which default MDT list to use.

Response receiver 206 is configured to determine which routers 106 it should receive responses from. Once responses have been received from routers 106-1 and 106-2, a response generator 208 is configured to send a mapping response message upstream again. The process described above is then repeated at the upstream router.

Figure 3:
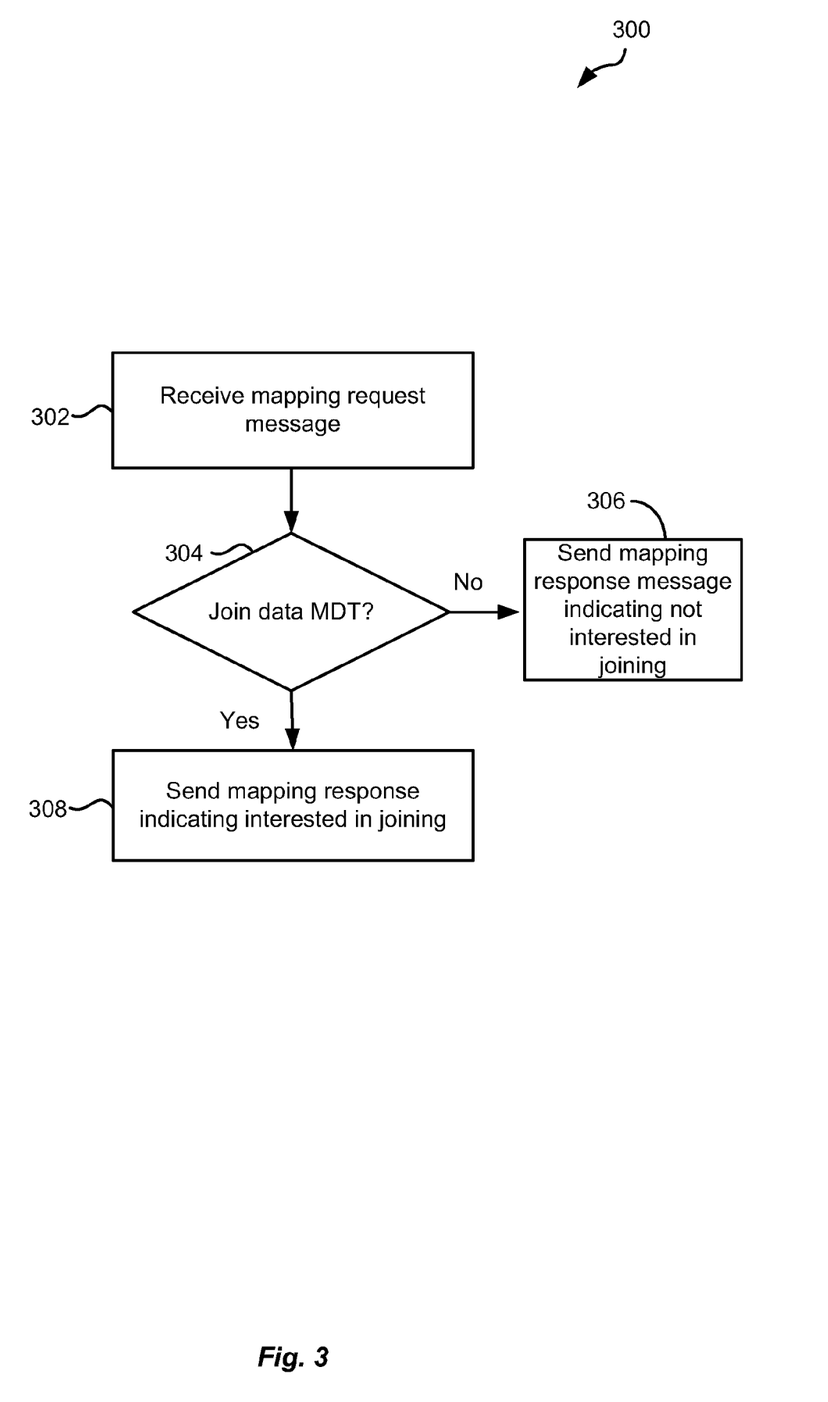
FIG. 3 depicts a simplified flow chart of a method for determining when to send a mapping response message upstream according to one embodiment of the present invention.

FIG. 3 depicts a simplified flow chart 300 of a method for determining when to send a mapping response message upstream according to one embodiment of the present invention. In step 302, a mapping request message is received at egress router 106 for joining a data MDT for a multicast stream.

In step 304, router 106 determines if receiver 110 wants to join the data MDT to receive traffic for the multicast stream.

If receiver 110 does not want to join the data MDT, in step 306, router 106 sends a mapping response message upstream indicating that the receiver is not interested.

If receiver 110 is interested, router 106 sends a response upstream that indicates receiver 110 is interested in joining the data MDT.

Figure 4:
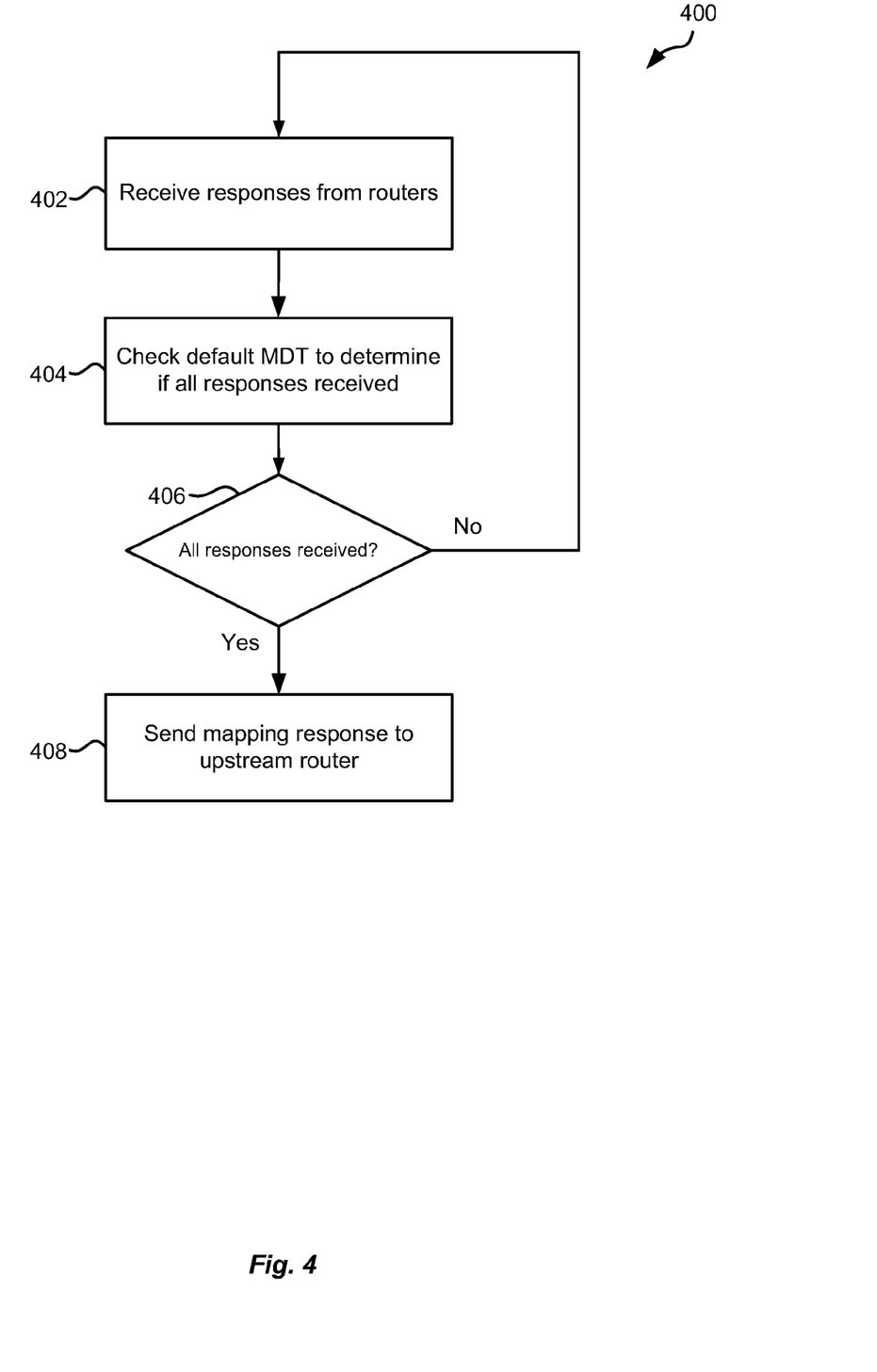
FIG. 4 depicts a simplified flowchart of a method for determining if all responses have been received from downstream routers according to one embodiment of the present invention.

FIG. 4 depicts a simplified flowchart 400 of a method for determining if all responses have been received from downstream routers according to one embodiment of the present invention. Step 402 receives responses from routers 106. The responses indicate a positive or negative whether routers 106 want to join the data MDT.

Step 404 checks default MDT list 210 to determine if all responses from downstream routers have been received that should have been received. For example, responses should be received from all routers 106 on the same interface that are downstream.

In step 406, it is determined if all responses have been received. If not, the process reiterates to step 402 where a router waits to receive more responses from downstream routers.

If responses have been received from all routers, step 408 sends a mapping response message with the responses to an upstream router. The upstream router can then perform the same process again as described in FIG. 4.

Accordingly, techniques for reliably switching from the default MDT to a data MDT are provided. The reliable switchover is provided using reliable signaling between a head-end router 102 and egress routers 106. Further, the switchovers are reliable because responses are received from all egress routers 106 that have joined a default MDT. Thus, the switchover from the default MDT to the data MDT does not occur until it is known whether or not all routers 106 in the default MDT want to receive traffic for the multicast stream.

Although the invention has been described with respect to specific embodiments thereof, these embodiments are merely illustrative, and not restrictive of the invention. Although a default MDT and data MDT are described, it will be understood that the default MDT and data MDT may be any data structure that may be used to distribute a stream of information may be used. A person skilled in the art will appreciate mechanisms about default MDTs and data MDTs, such as those described in ietf draft "draft-ietf-13vpn-2547bis-mcast-00.txt", which is incorporated by reference in its entirety for all purposes.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
    determining, at a first router, whether to switch from broadcasting data on a default multicast distribution tree (MDT) to a data MDT, the first router configured to broadcast data from a source to a plurality of routers, the default MDT broadcasting the data to the plurality of routers, and the data MDT broadcasting the data to at least a subset of the plurality of routers;
    sending a request message from the first router to the plurality of routers to join the data MDT;
    determining, at the first router, a list of downstream routers that are connected to the first router using the default MDT, the list being a default MDT list that includes all downstream routers that have joined the default MDT, and wherein there is a plurality of default MDT lists;
    based on the list of downstream routers that are connected to the first router, determining, at the first router, that responses to the request message have been received from the plurality of routers, each response to the request message indicating whether each of the downstream routers join the data MDT;
    based on the responses to the request message, determining, at the first router, which of the plurality of routers comprises the subset of the plurality of routers that will receive content from the data MDT; and
    switching the first router to broadcast the data from the default MDT to the data MDT only after determining that responses to the request message have been received from the plurality of routers.

2. The method of claim 1 wherein the list of downstream routers comprises all of the routers in the default MDT.

3. The method of claim 1, wherein at least one of the responses to the request message include routing information that is used to route data to a second router in the data MDT.

4. The method of claim 1, wherein the request message is sent through one of transfer control protocol (TCP) or border gateway protocol (BGP).

5. The method of claim 1, further comprising building the data MDT using information in the responses to the request message.

6. The method of claim 1, wherein the request message includes an identification of the source, the source being configured to output a stream of data to be transmitted via the data MDT.

7. The method of claim 1, wherein the request message includes a forward equivalence class of the data MDT.

8. The method of claim 1, wherein the request message includes an identifier to uniquely identify the multicast data stream to be sent via the data MDT.

9. A network device comprising:
    one or more processors; and
    a computer readable memory containing instructions that, when executed by the one or more computer processors, cause the one or more computer processors to perform a set of steps comprising:
        determining, at a first router, whether to switch from broadcasting data on a default multicast distribution tree (MDT) to a data MDT, the first router configured to broadcast data from a source to a plurality of routers, the default MDT broadcasting the data to the plurality of routers, and the data MDT broadcasting the data to at least a subset of the plurality of routers;
        sending a request message from the first router to the plurality of routers to join the data MDT;
        determining, at the first router, a list of downstream routers that are connected to the first router using the default MDT, the list being a default MDT list that includes all downstream routers that have joined the default MDT, and wherein there is a plurality of default MDT lists;
        based on the list of downstream routers that are connected to the first router, determining, at the first router, that responses to the request message have been received from the plurality of routers, each response to the request message indicating whether each of the downstream routers join the data MDT;
        based on the responses to the request message, determining, at the first router, which of the plurality of routers comprises the subset of the plurality of routers that will receive content from the data MDT; and
        switching the first router to broadcast the data from the default MDT to the data MDT only after determining that responses to the request message have been received from the plurality of routers.

10. The network device of claim 9, wherein the list of downstream routers comprises all of the routers in the default MDT.

11. The network device of claim 9, wherein at least one of the responses to the request message include routing information that is used to route data to a second router in the data MDT.

12. The network device of claim 9, wherein the request message is sent through one of transfer control protocol (TCP) or border gateway protocol (BGP).

13. The network device of claim 9, further comprising building the data MDT using information in the response to the request message.

14. The network device of claim 9, wherein the request message includes an identification of the source, the source being configured to output a stream of data to be transmitted via the data MDT.

15. The network device of claim 9, wherein the request message includes a forward equivalence class of the data MDT.

16. The network device of claim 9, wherein the request message includes an identifier to uniquely identify the multicast data stream to be sent via the data MDT.

17. A non-transitory computer readable medium including instructions executable by one or more processors for:
    determining, at a first router, whether to switch from broadcasting data on a default multicast distribution tree (MDT) to a data MDT, the first router configured to broadcast data from a source to a plurality of routers, the default MDT broadcasting the data to the plurality of routers, and the data MDT broadcasting the data to at least a subset of the plurality of routers;
    sending a request message from the first router to the plurality of routers to join the data MDT;
    determining, at the first router, a list of downstream routers that are connected to the first router using the default MDT, the list being a default MDT list that includes all downstream routers that have joined the default MDT, and wherein there is a plurality of default MDT lists;
    based on the list of downstream routers that are connected to the first router, determining, at the first router, that responses to the request message have been received from the plurality of routers, each response to the request message indicating whether each of the downstream routers join the data MDT;
    based on the responses to the request message, determining, at the first router, which of the plurality of routers comprises the subset of the plurality of routers that will receive content from the data MDT; and switching the first router to broadcast the data from the default MDT to the data MDT only after determining that responses to the request message have been received from the plurality of routers.

18. The non-transitory computer readable medium of claim 17, wherein the request message includes an identification of the source, the source being configured to output a stream of data to be transmitted via the data MDT.

19. The non-transitory computer readable medium of claim 17, wherein the request message includes a forward equivalence class of the data MDT.

20. The non-transitory computer readable medium of claim 17, wherein at least one of the responses to the request message includes routing information that is used to route data to a second router in the data MDT.

* * * * *